US012063552B2

(12) United States Patent
Yang et al.

(10) Patent No.: US 12,063,552 B2
(45) Date of Patent: *Aug. 13, 2024

(54) METHOD AND SYSTEM FOR SLA-BASED NETWORK SLICE CONTROL SERVICE

(71) Applicant: Verizon Patent and Licensing Inc., Basking Ridge, NJ (US)

(72) Inventors: Jin Yang, Orinda, CA (US); Lei Song, Basking Ridge, NJ (US); Edward Diaz, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,920

(22) Filed: Nov. 16, 2022

(65) Prior Publication Data

US 2023/0075099 A1 Mar. 9, 2023

Related U.S. Application Data

(63) Continuation of application No. 17/128,378, filed on Dec. 21, 2020, now Pat. No. 11,528,642.

(51) Int. Cl.
*H04W 28/24* (2009.01)
*H04W 28/02* (2009.01)
*H04W 48/18* (2009.01)

(52) U.S. Cl.
CPC ....... *H04W 28/24* (2013.01); *H04W 28/0268* (2013.01); *H04W 48/18* (2013.01)

(58) Field of Classification Search
CPC . H04W 48/18; H04W 28/24; H04W 28/0268; H04W 24/02
See application file for complete search history.

(56) References Cited

U.S. PATENT DOCUMENTS

| | | | |
|---|---|---|---|
| 2010/0248643 A1* | 9/2010 | Aaron | H04L 1/0022 709/233 |
| 2015/0358207 A1* | 12/2015 | Baldock | G06Q 30/0201 709/224 |
| 2017/0054595 A1* | 2/2017 | Zhang | H04L 41/0896 |
| 2017/0317894 A1* | 11/2017 | Dao | H04L 41/5009 |
| 2018/0343567 A1* | 11/2018 | Ashrafi | H04L 43/20 |
| 2019/0174322 A1* | 6/2019 | Deviprasad | H04L 41/0853 |
| 2020/0187071 A1* | 6/2020 | Chen | H04W 36/30 |
| 2020/0244551 A1* | 7/2020 | Tidemann | H04L 67/1008 |
| 2022/0166799 A1* | 5/2022 | Johnson | H04W 12/71 |
| 2022/0191743 A1* | 6/2022 | Sevindik | H04W 28/24 |

(Continued)

FOREIGN PATENT DOCUMENTS

| | | | | |
|---|---|---|---|---|
| EP | 3327990 | | 5/2018 | |
| EP | 3327990 A1 * | | 5/2018 | ......... H04L 41/5009 |

(Continued)

*Primary Examiner* — Mehmood B. Khan

(57) ABSTRACT

A method, a device, and a non-transitory storage medium are described in which an SLA-based network slice control service is provided. The service may provision a network slice with multiple tiers of service based on a performance metric with differing performance metric values. The service may also provision the network slice based on other factors such as location of an application service layer network. The service may monitor and reconfigure the network slice when the performance metric is not satisfied.

20 Claims, 10 Drawing Sheets

(56) References Cited

U.S. PATENT DOCUMENTS

| | | | | |
|---|---|---|---|---|
| 2022/0377131 | A1* | 11/2022 | Szilagyi | H04L 41/0894 |
| 2023/0020027 | A1* | 1/2023 | Buyukdura | H04W 24/02 |
| 2023/0327962 | A1* | 10/2023 | Kattepur | H04W 28/0268 |
| | | | | 455/414.1 |

FOREIGN PATENT DOCUMENTS

| | | | | |
|---|---|---|---|---|
| WO | 2020/227435 | | 11/2020 | |
| WO | WO-2020227435 | A1 * | 11/2020 | H04L 47/127 |
| WO | WO-2023060182 | A1 * | 4/2023 | H04W 76/38 |

* cited by examiner

METHOD AND SYSTEM FOR SLA-BASED NETWORK SLICE CONTROL SERVICE

CROSS REFERENCE TO RELATED APPLICATION

This patent application is a continuation of U.S. patent application Ser. No. 17/128,378 entitled "METHOD AND SYSTEM FOR SLA-BASED NETWORK SLICE CONTROL SERVICE" and filed on Dec. 21, 2020, the disclosure of which is incorporated by reference herein in its entirety.

BACKGROUND

Development and design of networks present certain challenges from a network-side perspective and an end device perspective. For example, Centralized Radio Access Network (C-RAN) and Open Radio Access Network (O-RAN) architectures have been proposed to satisfy the increasing complexity, densification, and demands of end device application services of a future generation network.

DETAILED DESCRIPTION

Figure 1:
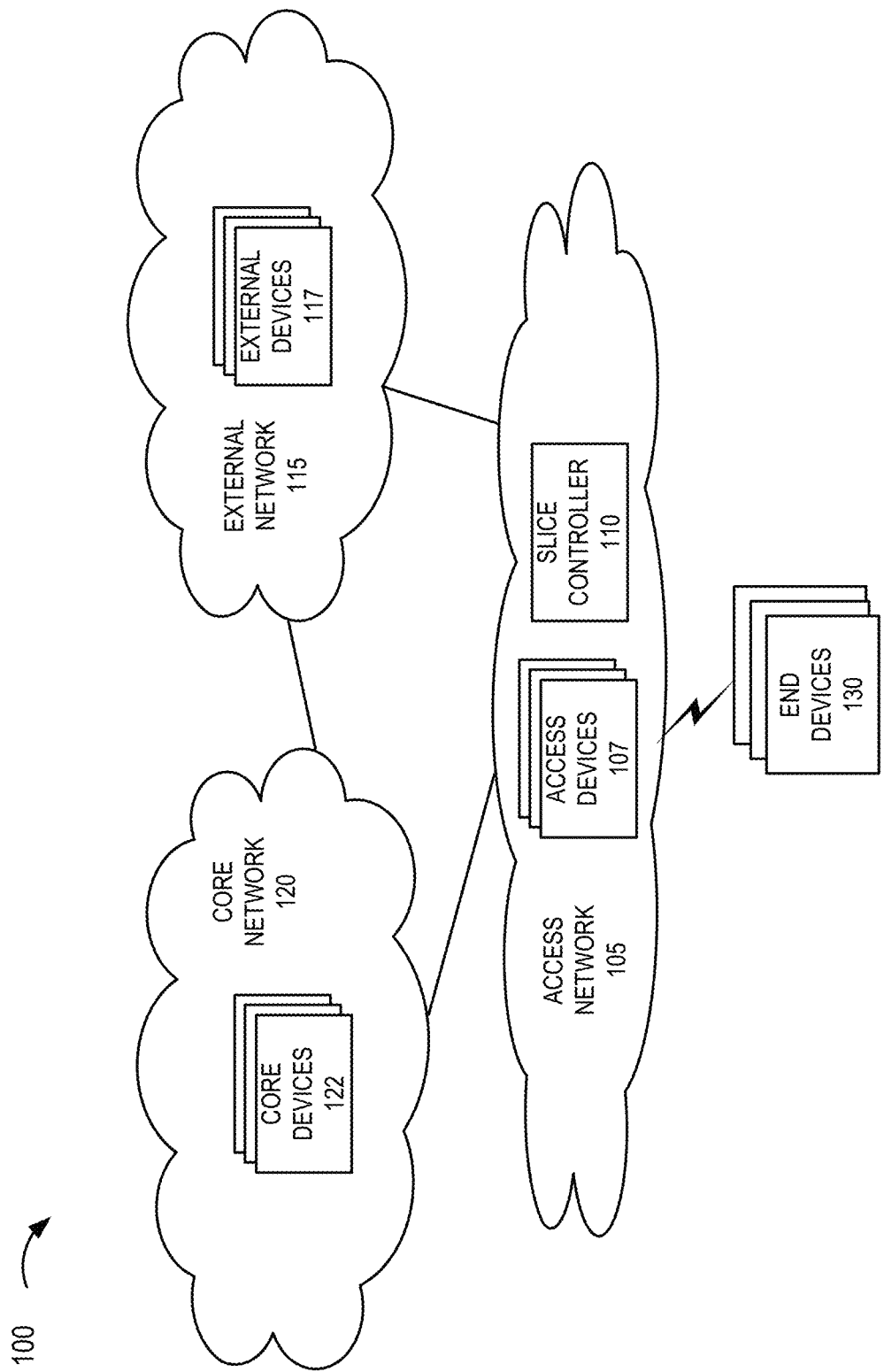
FIG. 1 is a diagram illustrating an exemplary environment in which an exemplary embodiment of a SLA-based network slice control service may be implemented.

The following detailed description refers to the accompanying drawings. The same reference numbers in different drawings may identify the same or similar elements. Also, the following detailed description does not limit the invention.

The development and design of next generation or future generation wireless networks may be based on cloud technologies, software defined networking (SDN), and network function virtualization (NFV). Ubiquitous automation, network slicing, machine learning (ML), artificial intelligence (AI), closed loop service assurance, self-healing, self-configuring, and other network attributes and/or services may be integral aspects of the network. The network may include a RAN and a core network, and perhaps other types of networks, such as a service and/or application layer network, a cloud network, a multi-access edge computing (MEC) network, and so forth.

The performance of a network slice may be reliant on multiple networks, such as the radio access network, the core network, and perhaps the application service layer network, and various criteria and factors, such as rendering the network slice, carrier aggregation of a device, radio quality, cell-level congestion, latency associated with the core network, Transmission Control Protocol (TCP) flow control, aggregation point for the traffic being sourced for the network slice, reaction to dynamism in the RAN and/or the core network, among other things.

Currently, a network slice may be configured according to a user case. For example, a user that requests voice service may be assigned to a network slice that is configured for voice service. In this regard, network slices that are configured based on specific applications or services can be limiting in terms of maximizing the allocation of network resources to support users. Additionally, given the dynamic nature of network performance over time, network slices that are configured or defined based on specific applications and/or services may result in users and/or traffic directed to a network slice that may be underperforming.

According to exemplary embodiments, a Service Level Agreement (SLA)-based network slice control service is described. According to an exemplary embodiment, the SLA-based network slice control service may configure a network slice based on network architecture and performance in contrast to a specific application service. According to an exemplary embodiment, the SLA-based network slice control service may configure the network slice based on one or multiple performance metric requirements. For example, the performance metric or requirement may pertain to latency (e.g., one-way and/or round trip), reliability, throughput, and/or other suitable performance metric (e.g., jitter, packet error rate, packet loss, bit rate (e.g., guaranteed, maximum, aggregate maximum, etc.), retransmission, bandwidth, availability, payload size, and/or other types of performance metrics, SLA metric, etc.). According to an exemplary embodiment, the SLA-based network slice control service may configure the network slice based on other factors such as a location of an application server that provides an application service, end-to-end performance, number of user connections to the application server, and/or other configurable criterion.

According to an exemplary embodiment, the SLA-based network slice control service may monitor state information of the one or multiple performance metric requirements associated with a network slice. For example, the network slice may be configured or defined to provide a threshold value of a performance metric relating to latency, reliability, and/or some other performance metric, as described herein. According to an exemplary embodiment, the SLA-based network slice control may provide radio resource management to achieve one or multiple target performance metric values and/or other parameters or configurations of the network slice.

According to an exemplary embodiment, the SLA-based network slice control service may be implemented by a network device included in an access network (e.g., a RAN or other type of access network). For example, the network device may be co-located with a centralized unit-control plane (CU-CP) device, at a far edge of a MEC network or other type of application layer network that may provide an application service, or another suitable location, as described herein. According to various exemplary embodiments, the network device may be implemented to include a RAN Intelligent Controller (RIC), a network slice controller, and/or another type of controller device. According to an exemplary embodiment, the network device may include logic that manages RAN resources, parameters, and/or configurations associated with a RAN in support of a network slice and its associated configurations (e.g., performance metrics, definition, other factors of the network slice), as described herein.

According to an exemplary embodiment, the SLA-based network slice control service may establish and maintain the performance of a network slice that may be defined according to one or multiple performance metrics, and also include one or multiple QoS or SLA levels or tiers pertaining to one or multiple other performance metrics. For example, a network slice may be defined according to a performance metric such as throughput, and the network slice may also provide one or multiple tiers of QoS or SLA according to different threshold values associated with latency and/or reliability.

In view of the foregoing, the SLA-based network slice control service may provide QoS-based network slices in contrast to application-based network slices. The allocation of network resources that support network slices with performance metric configurations may provide a greater versatility and/or flexibility for access and delivery of various application services to users. Additionally, the SLA-based network slice control service may manage radio resources to achieve end-to-end performance and associated performance metric requirements of the network slices.

FIG. 1 is a diagram illustrating an exemplary environment 100 in which an exemplary embodiment of the SLA-based network slice control service may be implemented. As illustrated, environment 100 includes access network 105, an external network 115, and a core network 120. Access network 105 includes access devices 107 (also referred to individually or generally as access device 107) and a slice controller 110. External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or other type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 105 may include one or multiple networks of one or multiple types and technologies. For example, access network 105 may be implemented to include a 5G-access network (5G-AN) or a 5G-RAN, a future generation RAN (e.g., a 6G RAN or subsequent generation RAN). Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120. According to an exemplary embodiment, access network 105 may include the SLA-based network slice control service, as described herein.

Access network 105 may include different and multiple functional splitting, such as options 1, 2, 3, 4, 5, 6, 7, or 8 that relate to combinations of access network 105 and core network 120 including an Evolved Packet Core (EPC) network and/or a NG core (NGC) network, or the splitting of the various layers (e.g., physical layer, Media Access Control (MAC) layer, RLC layer, and PDCP layer, etc.), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone (NSA) NR, standalone (SA) NR, etc.).

According to some exemplary embodiments, access network 105 may be implemented to include various architectures of wireless service, such as, for example, macrocell, microcell, femtocell, picocell, metrocell, new radio (NR) cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an evolved Long Term Evolution (eLTE) evolved Node B (eNB), an eNB, a radio network controller (RNC), a remote radio head (RRH), a baseband unit (BBU), a radio unit (RU), a CU, a CU control plane (CU CP), a CU user plane (CU UP), a DU, a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB)), 5G ultra-wide band (UWB) nodes, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), 2D beamforming, antenna spacing, tilt (relative to the ground), radiation pattern, directivity, elevation, planar arrays, and so forth.

Slice controller 110 may include a network device that provides the SLA-based network slice control service, as described herein. Slice controller 110 may configure and maintain performance of network slices according to one or multiple performance metrics and their associated threshold value(s). For example, slice controller 110 may configure and manage a network slice according to latency and reliability and respective threshold values pertaining to latency and reliability. The threshold value pertaining to a performance metric may be a single value or within a range of values, for example.

Slice controller 110 may configure network slices based on other factors, as previously described, such as location of a host or server of the application service, the number of user connections/per network slice and/or host/server, and/or another configurable criterion. For example, there may be multiple tiers of MECs in which the locale of MEC networks and/or performance metrics associated with network paths between end device 130 and the MEC network may differ. By way of further example, a three-tiered MEC network framework may include a centralized tier (e.g., coastal, co-located with core network 120, upstream from core network 120, etc.), an edge tier (e.g., regional, etc.), and a far edge tier (e.g., local or co-located with access network 105). According to other examples, MECs may include a different number of tiers (e.g., two-tiered, four-tiered, five-tiered, etc.) and/or different types of tiers (e.g., tiers based on subscription levels, etc.). Slice controller 110 may configure or re-configure over time network resources that provide the access network 105 portion of the network slice in view of these other factors.

According to an exemplary embodiment, slice controller 110 may obtain state information pertaining to network resources and configurations that support the provisioning of the network slice. For example, the state information may pertain to access network 105, access device 107, a network path or segment of the network slice, radio resources (e.g., carriers, radio spectrum, RAT, etc.), antenna parameters and configurations, and/or various network services (e.g., DC, CoMP, etc.), as described herein. The state information may also include or pertain to network resources external from access network 105 such as core network 120, external network 115, core device 122, external device 117, a network path or segment of the network slice, and/or other network resources that may support the network slice. Slice controller 110 may obtain state information pertaining to the number of users, connections, and/or traffic flows associated with the network slice, the host or server of the application service, and/or a sub-network slice of a particular QoS and/or SLA supported by the network slice, as described herein.

Slice controller 110 may use the state information to determine whether the network slice satisfies the performance metric thresholds, configurations, and/or parameters of the network slice. According to various exemplary embodiments, slice controller 110 may invoke and/or perform reactive and/or proactive measures to maintain network slice performance and/or to address an underperforming network slice. For example, slice controller 110 may identify adjustments to a current provisioning of the network slice based on the state information, current utilizations of network resources, and available network resources. Slice controller 110 may execute the adjustment or modification to the provisioning of the network slice, as described herein. For example, slice controller 110 may configure various access devices 107 and other components, parameters, and/or configurations of the network slice to sustain network slice performance and associated performance metric requirements, as described herein.

According to various exemplary embodiments, slice controller 110 may communicate with other network devices, such as an orchestrator device, a network slice selection function (NSSF), and/or other types of network devices that may manage a network slice (or portion thereof) and/or may provide resources that support the network slice (or portion thereof).

External network 115 may include one or multiple networks of one or multiple types and technologies. For example, external network 115 may be implemented to include a service or an application-layer network, a cloud network, a private network, a public network, a MEC network, a fog network, the Internet, a service provider network, the World Wide Web (WWW), an Internet Protocol Multimedia Subsystem (IMS) network, a Rich Communication Service (RCS) network, software defined network (SDN), a virtual network, a packet-switched network, a data center, or other type of network that may provide access to and may host an end device application, service, or asset (also referred to as an "application service"). According to an exemplary embodiment, external network 115 may include the SLA-based network slice control service, as described herein.

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines, SDN devices, cloud computing devices, platforms, and other types of network devices, platforms, and/or architectures pertaining to various network-related functions (e.g., security, management, charging, billing, authentication, authorization, policy enforcement, development, etc.).

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Core network 120 may include one or multiple networks of one or multiple network types and technologies. Core network 120 may include a complementary network of access network 105. For example, core network 120 may be implemented to include an NGC network, an Evolved Packet Core (EPC) of an LTE network, an LTE-Advanced (LTE-A) network, and/or an LTE-A Pro network, a future generation core network (e.g., a 6G or beyond core network, etc.), and/or another type of core network. According to an exemplary embodiment, core network 120 may include the SLA-based network slice control service, as described herein.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), an NSSF, a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130.

Figure 2:
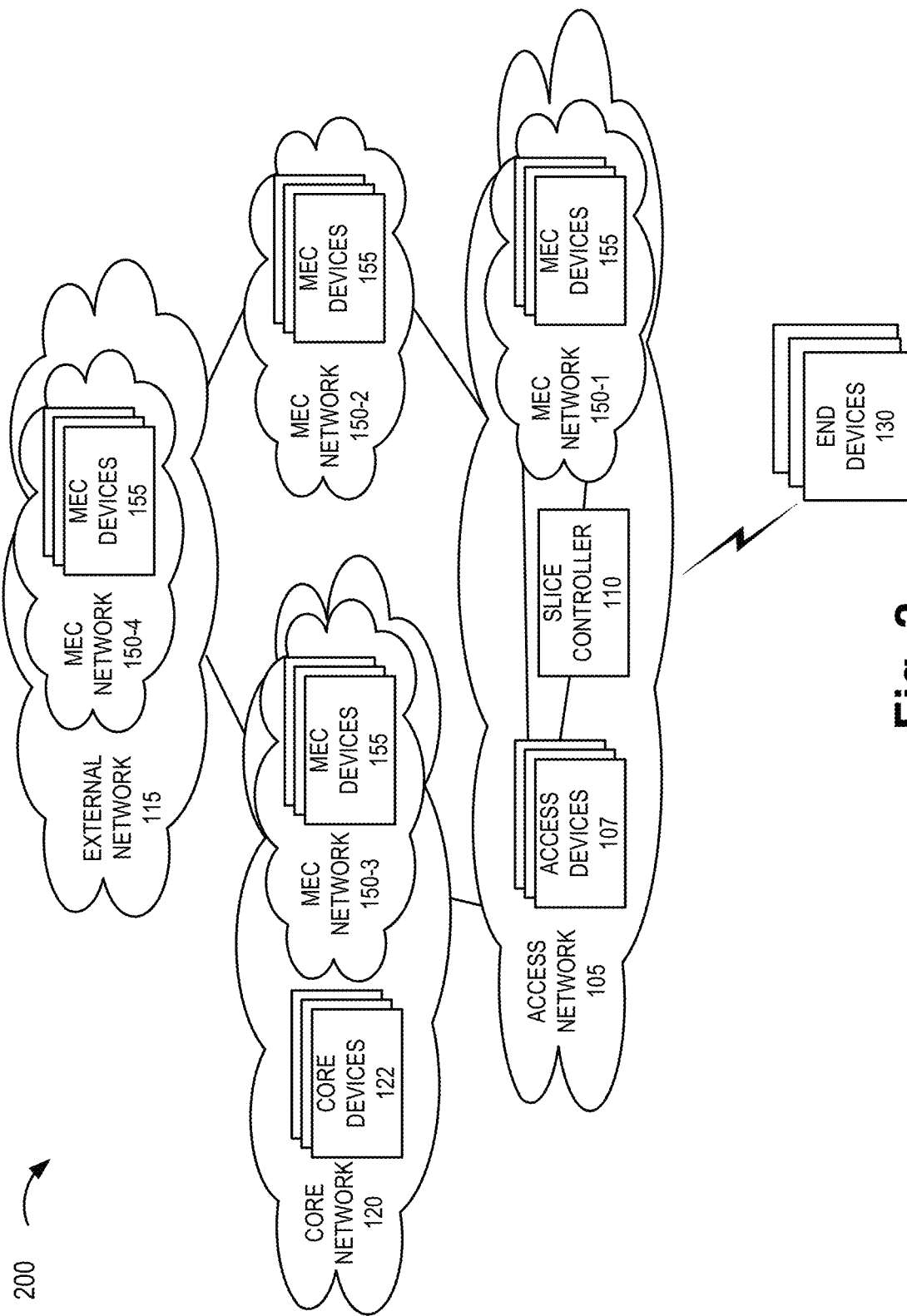
FIG. 2 is a diagram illustrating another exemplary environment in which an exemplary embodiment of the SLA-based network slice control service may be implemented.

FIG. 2 is a diagram illustrating another exemplary environment 200 in which an exemplary embodiment of the SLA-based network slice control service may be implemented. As previously described, there may be multiple tiers of MECs (or other types of application layer networks) in which the locale of MEC networks and servers/hosts that provide an application service and/or network paths between end device 130 and the MEC network/server and/or host may differ. By way of further example, there may be a far edge or local tier (e.g., co-located with access network 105, such as MEC network 150-1), an edge or regional tier (e.g., MEC network 150-2), a core or state/multi-state tier or other type of area (e.g. co-located with core network 120, such as MEC network 150-3), and a centralized or coastal tier (e.g., upstream from core network 120 or other locale, such as MEC network 150-4) (also referred to as MEC networks 150 or individually or generally MEC network 150. According to other examples, MEC network 150 may include a different number of tiers and/or different types of tiers (e.g., tiers based on subscription levels, etc.). Alternatively, environment 200 may not be a multi-tier MEC network (or other application layer network) framework.

MEC network 150 includes a network that provides application services, as described herein. MEC network 150 may be implemented using one or multiple technologies including, for example, network function virtualization (NFV), containers, SDN, cloud computing, Infrastructure-as-a-Service (IaaS), Platform-as-a-Service (PaaS), Software-as-a-Service (SaaS), or another type of network technology.

Depending on the implementation, MEC network 150 may include various types of network devices that are illustrated in FIG. 2 as MEC devices 155. For example, MEC device 155 may include a virtual network device (e.g., virtualized network function (VNF), server, host, container, hypervisor, virtual machine, network function virtualization infrastructure (NFVI), and/or other types of virtualization element, layer, hardware resource, operating system, software resource, engine, etc.) that may provide an application service and/or a non-virtual network device that may provide an application service to end device 130. Additionally, depending on the implementation, MEC devices 155 may include other types of network devices, such as an orchestrator (e.g., a network function virtualization orchestrator (NFVO), a mobile edge (ME) orchestrator, etc.), a virtualized infrastructure manager (VIM), a virtual network function manager (VNFM), an ME platform manager, an operations support system (OSS), a local domain name system (DNS), registries, a traffic rules controller, an ME platform, and/or other types of network devices (e.g., routers, core devices 122, an ingress device, a load balancer, etc.), and network resources (e.g., storage devices, communication links, etc.).

As previously described, the SLA-based network slice control service may provide a network slice that may be defined according to a performance metric, and may also provide one or multiple tiers of QoS according to different threshold values associated with another type of performance metric. The network slice may be based on other factors, such as location of host/server and/or other factor or configuration, as described herein.

Figure 3:
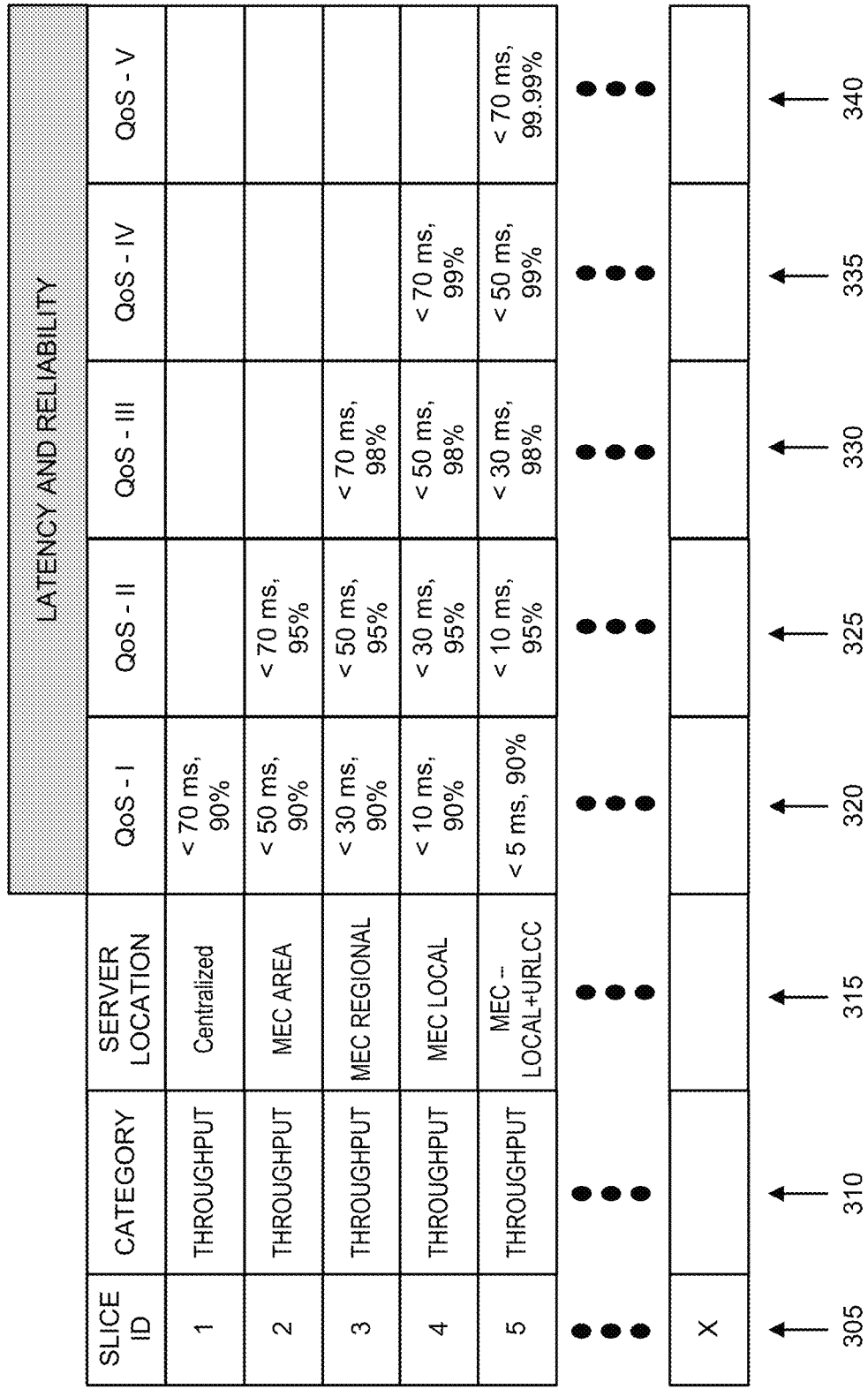
FIG. 3 is a diagram illustrating exemplary network slice configuration information.

FIG. 3 is a diagram illustrating exemplary network slices according to the SLA-based network slice control service. As illustrated, a table 300 illustrates exemplary network slice configuration information. For example, a field 305 may store data indicating a network slice identifier of a network slice, a field 310 may store data indicating a category of the network slice, a field 315 may store data indicating exemplary server location, and fields 320 through 340 may store data indicating exemplary QoS tiers provided by the network slice. According to this example, the different QoS tiers may relate to latency and reliability and have associated threshold values pertaining to these performance metrics.

The values, performance metrics, and parameters illustrated and described in relation to FIG. 3 are exemplary. According to other exemplary embodiments, the network slice of the SLA-based network slice control service may include additional, different, and/or fewer performance metrics, parameters, and configurations than those depicted and described.

Referring to FIG. 3, network slices 1-5 may be defined based on a configured category of network slice. According to this example, the category for the network slices 1-5 may be defined by a same performance metric (e.g., throughput and/or another performance metric or other categorical criterion), as illustrated in field 310. According to other examples, the number or type of performance metric may be different. For example, the category of the network slice may relate to reliability or include multiple and different performance metrics. Although not illustrated, field 310 may also include a threshold value pertaining to throughput. According to various exemplary implementations, the throughput value may be different or the same among one or more of the network slices 1-5, for example.

As further illustrated, field 315 may store other configuration data pertaining to the network slice. According to this example, the configuration information may include configuration data pertaining to server location of the host/server that provides an application service, for example. As previously described in relation to FIG. 2, the network slice and end-to-end network path may be different depending on this criterion. According to various exemplary embodiments, criterion other than server location may be used as a basis for configuration of the network slice.

Referring back to FIG. 3, according to this example, network slices 1-5 may be further configured to provide or support QoS flows that relate to latency and reliability, for example, and threshold values that relate to latency and reliability and provide distinct performance metric differentiation. In this example, the performance metric of the category of the network slice (e.g., field 310) is different from the performance metric pertaining to a sub-category or QoS flow of the network slice. According to other exemplary embodiments, one or multiple different performance metrics associated with the QoS tier or flow of the network slice may be implemented. As such, network slices 1-5, for example, may be distinguished from a network slice configured or defined according to a use case (e.g., enhanced Mobile Broadband (eMBB), massive machine-type communication (MMTC), ultra-high reliability and low latency communication (URLLC)) and/or an application service (e.g., voice, etc.).

According to an exemplary embodiment, slice controller 110 may manage access network 105 resources to provision a portion of the network slice (e.g., access network 105 portion) that supports the performance metric of a QoS configuration of the network slice. Slice controller 110 may also provision other configurations of the network slice (e.g., location of server, etc.) based on the selection of access device 107 and associated network path or route, for example.

Figure 4A:
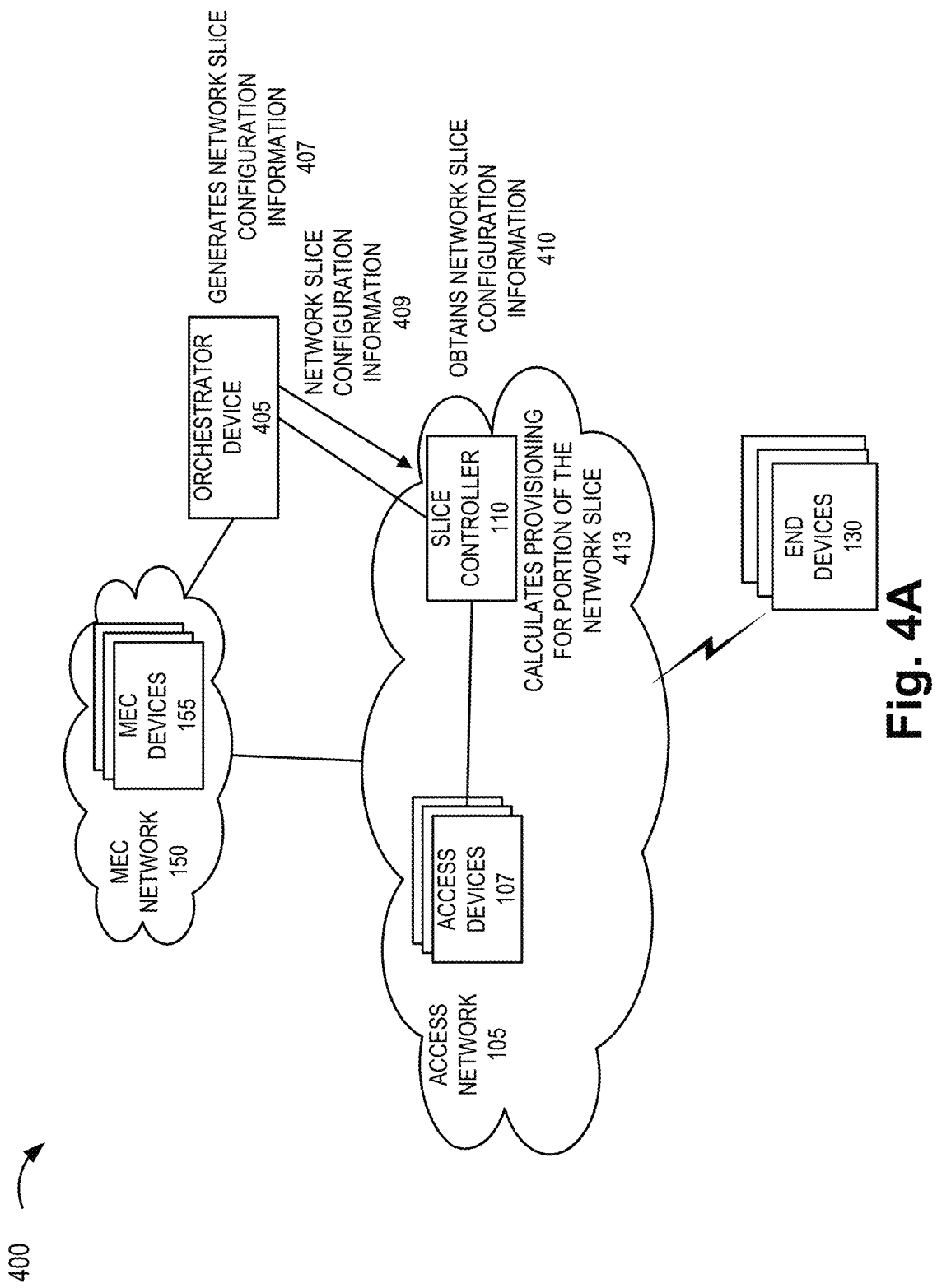
FIGS. 4A-4E are diagrams illustrating an exemplary process of an exemplary embodiment of the SLA-based network slice control service.

FIGS. 4A-4E are diagrams illustrating an exemplary process 400 of an exemplary embodiment of the SLA-based network slice control service. Referring to FIG. 4A, according to an exemplary scenario, assume that a network slice is to be configured. As illustrated, an orchestrator device 405 may generate configuration information 407 for the network slice. For example, orchestrator device 405 may include logic that manages a network slice from end-to-end (e.g., MEC device 155 (e.g., server device) to end device 130).

Orchestrator device 405 may transmit network slice configuration information 409 to slice controller 110, and slice controller 110 may obtain the network slice configuration information 410. The network slice configuration information may include parameters and values that need to be satisfied in the provisioning of the network slice supported by access network 105. The parameters and values may include one or multiple performance metrics and values pertaining to the QoS of the network slice. For example, the parameters and values may relate to the category of the network slice and one or multiple QoS sub-categories or tiers of the network slice, as described herein. The performance metric and value may pertain to the end-to-end QoS and/or SLA of the network slice and/or a portion of the network slice (e.g., in access network 105). The parameters and values may also relate to other configurations of the network slice or portion of the network slice, such as the location of the server, tier of a multi-tier application layer network, and/or other configurable factors of relevance to provision the portion of the network slice.

As further illustrated, based on the network slice configuration information, slice controller 110 may calculate the provisioning of the access network portion of the network slice 413. For example, slice controller 110 may select various network resources of access network 105, such as type and location of one or multiple access devices 107, the RAT, number of carriers, frequency spectrum, antenna configuration (e.g., MIMO, etc.), radio scheduler, and other configurations (e.g., DC, NSA, etc.). The calculation may account for expected performance metrics and values and other factors associated with the network slice portion and end-to-end of the network slice. As an example, assume that end-to-end latency of the network slice is 70 ms, and the access network portion of the network slice is to provide no more than 45 ms of latency (e.g., MEC network 150 and core network 120 may contribute 25 ms of latency towards the end-to-end latency of the network slice). Slice controller 110 may calculate a provisioning for the network slice portion that satisfies the threshold latency requirement. According to some exemplary embodiments, slice controller 110 may include artificial intelligence (AI)/machine learning (ML) algorithms to calculate a configuration to support a network performance metric and value.

Figure 4B:
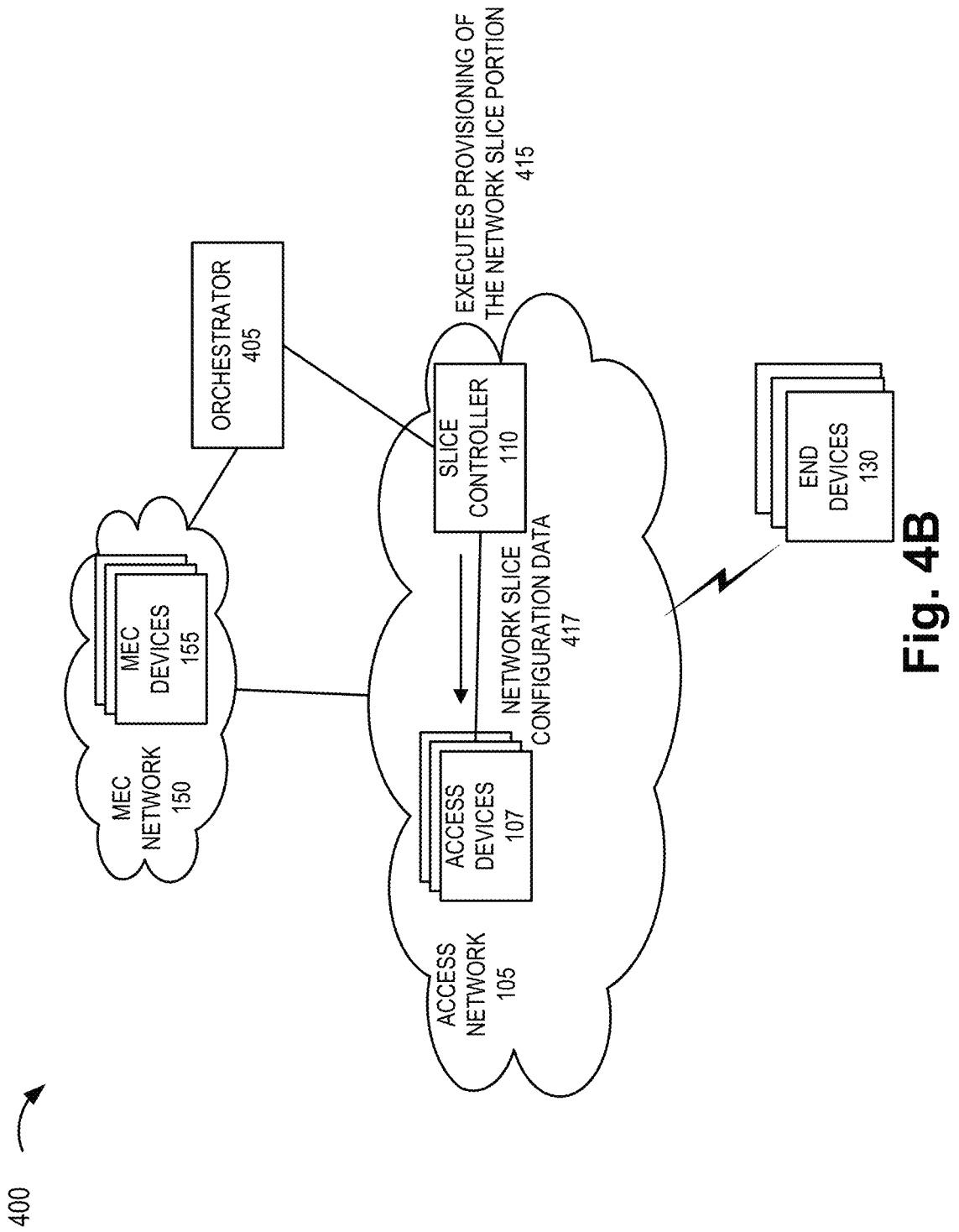

Referring to FIG. 4B, based on a result of the calculation, slice controller 110 may execute the provisioning of the network slice portion 415. For example, slice controller 110 may transmit network slice configuration data 417 to access devices 107 of relevance. Access devices 107 may configure the network slice portion and/or slice controller 110 in accordance with the network slice configuration data 417.

Figure 4C:
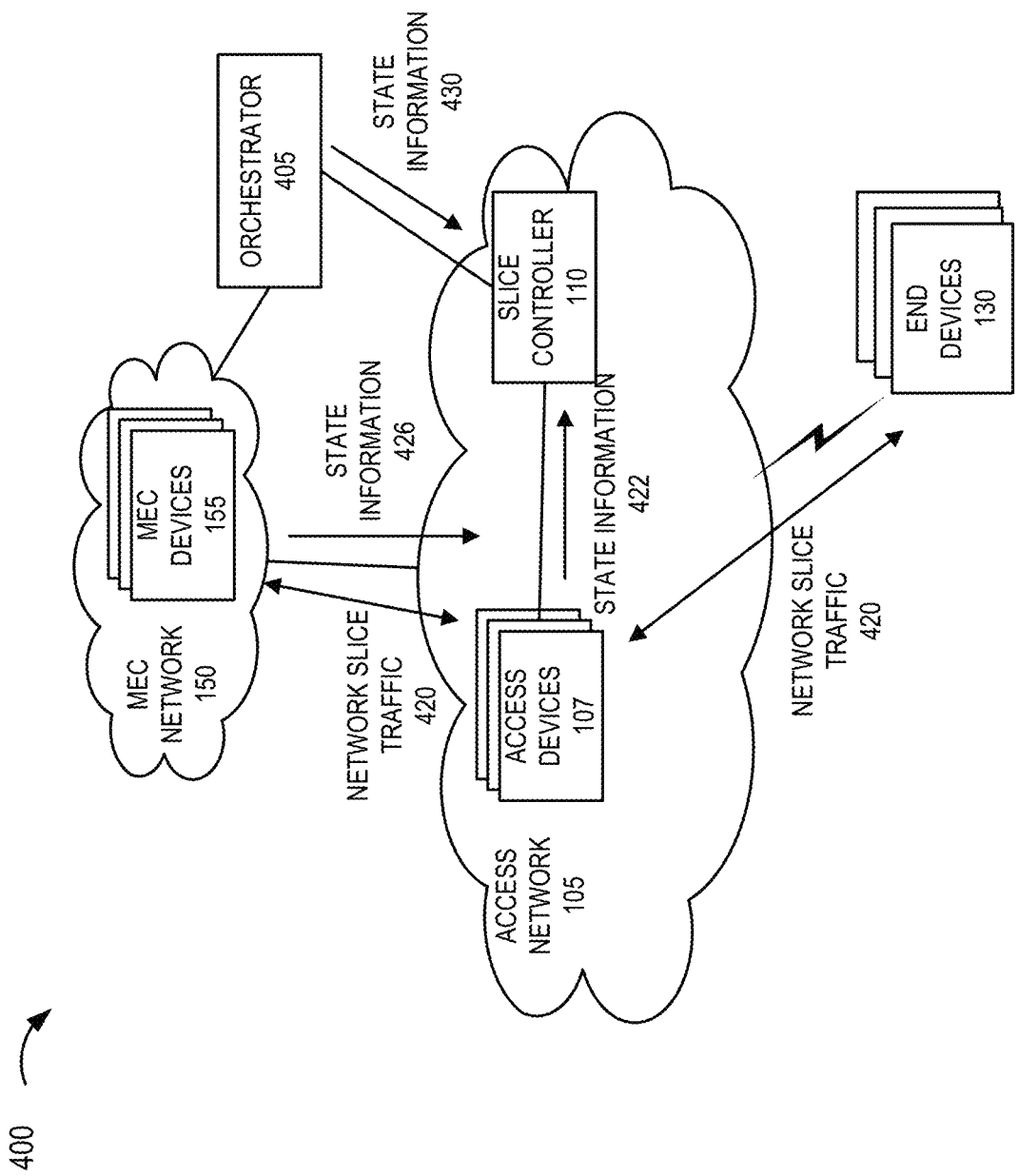

Referring to FIG. 4C, assume after the provisioning, network slice traffic 420 may flow between end device 130 and MEC device 155 of MEC network 150. As illustrated, slice controller 110 may receive state information 422 from access device 107. For example, the state information may pertain to network resource utilization, performance metrics, and/or other parameters associated with network performance. Slice controller 110 may also receive state information 426 and/or 430 from MEC network 150 and/or orchestrator 405 pertaining to the network slice portion and/or the network slice end-to-end.

Figure 4D:
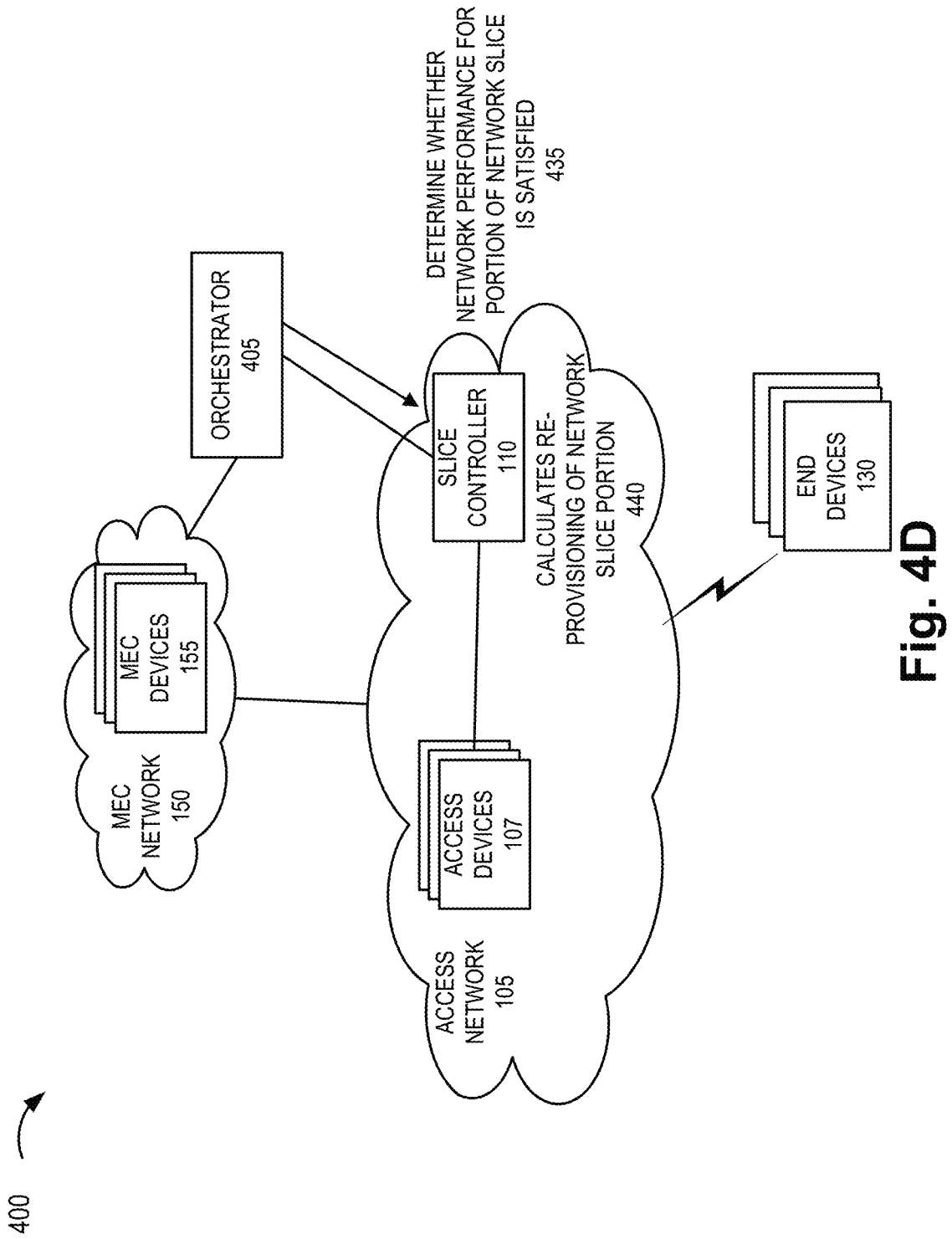

Referring to FIG. 4D, slice controller 110 may determine whether the network performance for the portion of the network slice is satisfied 435. For example, slice controller 110 may analyze the state information to determine whether the portion of the network slice is satisfying a performance metric and value. According to this exemplary scenario, slice controller 110 may determine that the portion of the network slice is underperforming, and that re-provisioning is needed. As such, slice controller 110 may calculate the re-provisioning of the portion of the network slice. For example, slice controller 110 may select a different access device 107, alter parameters regarding the number of carriers, the frequency spectrum to use, antenna configuration, the radio scheduler, and/or other aspect of access network 105 provisioning. According to some exemplary scenarios, slice controller 110 may change the server location when network performance may still be satisfied. For example, referring to FIG. 3, slice controller 110 may change the network slice portion from slice 2, QoS-I to slice 3, QoS-II or slice 4, QoS-III, or vice versa.

According to another exemplary scenario, slice controller 110 may determine that the portion of the network slice is satisfying the requirement network performance. As such, slice controller 110 may not undertake a re-provisioning procedure. Rather, slice controller 110 may continue to monitor the network performance of the portion of the network slice and/or network slice in accordance with a performance metric and value, and/or other factors associated with the configuration of the network slice or portion thereof.

Figure 4E:
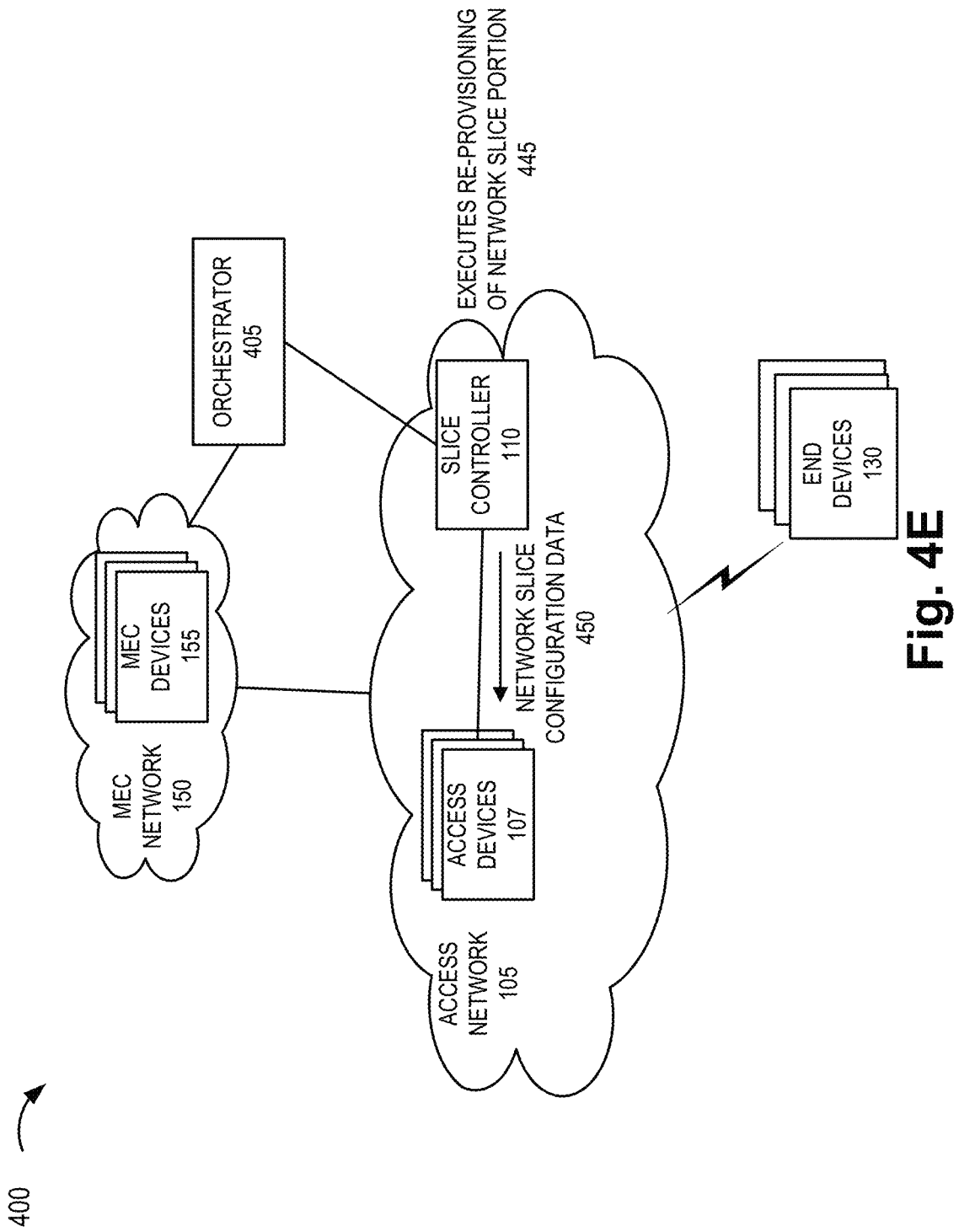

Referring to FIG. 4E, slice controller 110 may execute the re-provisioning of the network slice portion 445. For example, the re-provisioning may include transmitting network slice configuration data 450 to access devices 107 for execution. Access devices 107 may configure the network slice portion and/or slice controller 110 in accordance with the network slice configuration data 417.

FIGS. 4A-4E illustrate an exemplary embodiment of a process of the SLA-based network slice control service, according to other exemplary scenarios, the SLA-based network slice control service may perform additional operations, fewer operations, and/or different operations than those illustrated and described. For example, although slice controller 110 has been described in relation to access network 105, slice controller 110 may be implemented to configure and provision a network other than access network 105, as described herein. For example, the SLA-based network slice control service may include multiple slice controllers in which there may be a slice controller 110 for an application layer network, a slice controller 110 for core network 120, and slice controller 110 for access network 105. This may be in addition to an orchestrator and/or another type of controller that may manage a network slice from end-to-end.

Figure 5:
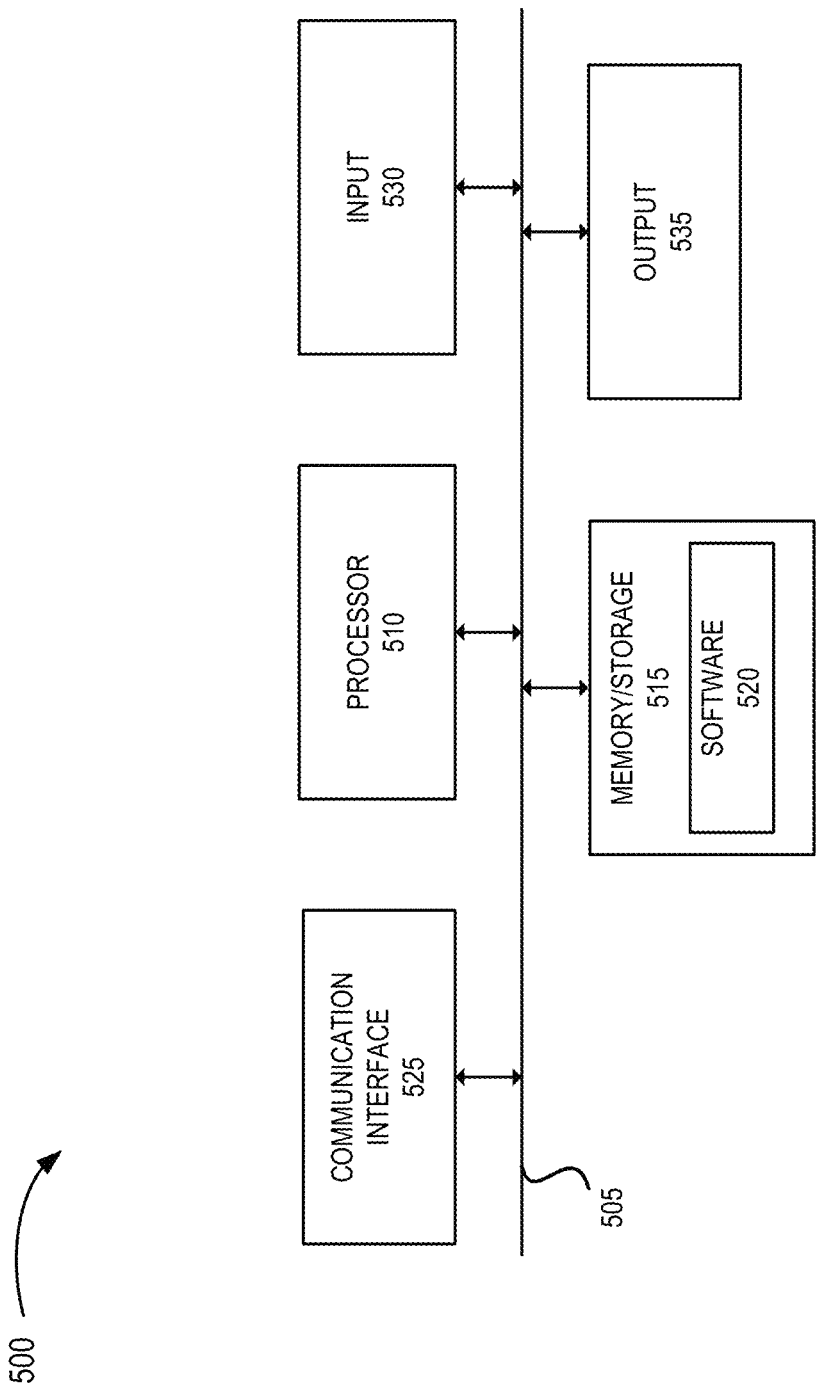
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to access device 107, slice controller 110, external device 117, core device 122, end device 130, MEC device 155, orchestrator 405, and/or other types of network devices, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation, or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, learning, model-based, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to slice controller 110, software 520 may include an application that, when executed by processor 510, provides a function and/or a process of the SLA-based network slice control service, as described herein. Software 520 may also include firmware, middleware, microcode, hardware description language (HDL), and/or other form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service-based interface, or a reference interface, for example.

Input 530 permits an input into device 500. For example, input 530 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 500 may be implemented in the same manner. For example, device 500 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., external network 115) and/or another type of network (e.g., access network 105, core network 120, etc.). Thus, network devices described herein may be implemented as device 500.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a function or a process described herein. Alternatively, for example, according to other implementations, device 500 performs a function or a process described herein based on the execution of hardware (processor 510, etc.).

Figure 6:
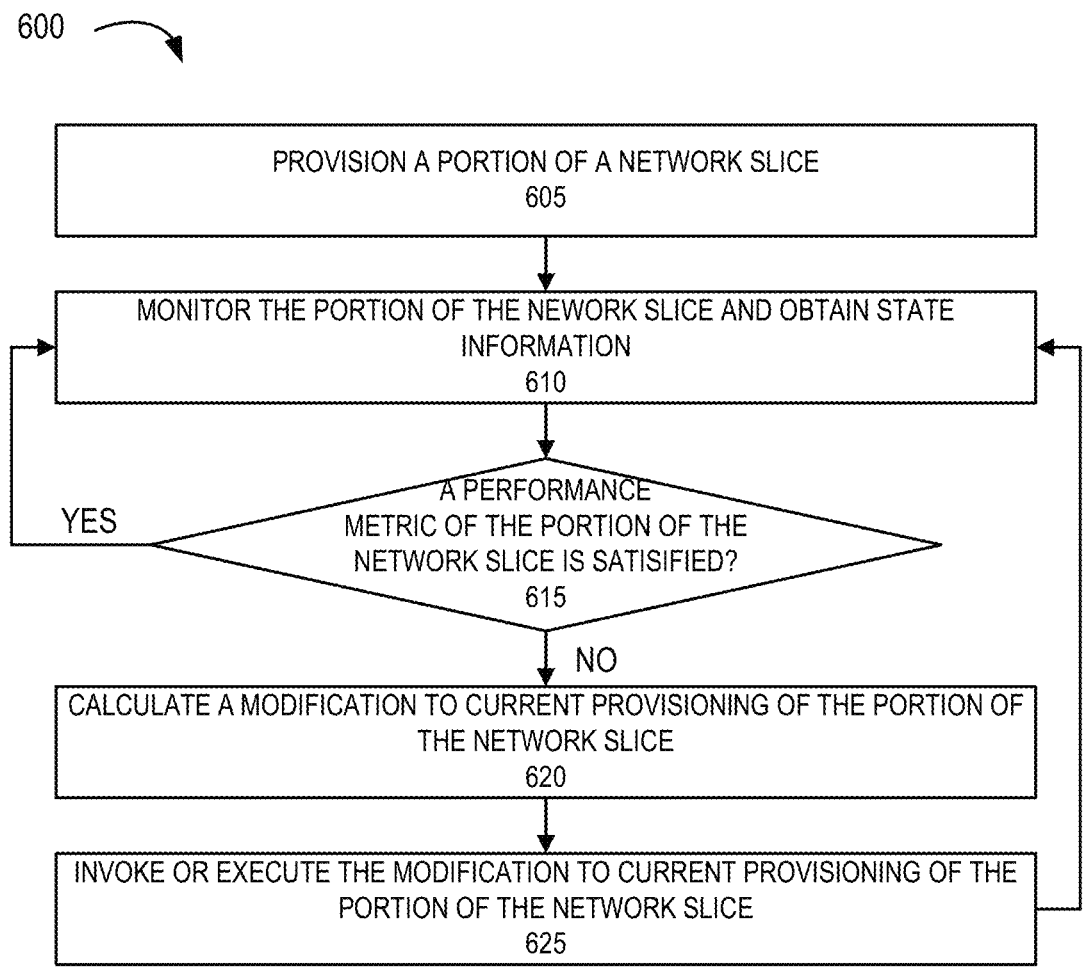
FIG. 6 is a flow diagram illustrating an exemplary process of an exemplary embodiment of the SLA-based network slice control service.

FIG. 6 is a flow diagram illustrating an exemplary process 600 of an exemplary embodiment of the SLA-based network slice control service. According to an exemplary embodiment, slice controller 110 may perform a step of process 600. According to an exemplary implementation, processor 510 executes software 520 to perform the step of process 600, as described herein. Alternatively, the step may be performed by execution of only hardware.

In block 605, a portion of a network slice may be provisioned. For example, slice controller 110 may provision the portion of the network slice based on configuration data that indicates one or multiple performance metrics and values that the network slice and/or the portion of the network slice are to satisfy, as described herein. The portion of the network slice may also satisfy other types of parameters (e.g., location of server, category of network slice, etc.), as described herein.

In block 610, the portion of the network slice may be monitored and state information may be obtained. For example, slice controller 110 may monitor and obtain state information pertaining to the network slice and/or the portion of the network slice.

In block 615, it may be determined whether a performance metric of the portion of the network slice satisfied. For example, slice controller 110 may analyze the state information. Slice controller 110 may calculate whether the performance metric and value associated with the network slice or portion of the network slice is satisfied.

When it is determined that the performance metric is satisfied (block 615-YES), process 600 may return to block 610. When it is determined that the performance metric is not satisfied (block 615-NO), a modification to the current provisioning of the portion of the network slice may be calculated (block 620). For example, slice controller 110 may alter the current configuration of the network slice portion in order to satisfy the expected network performance of the network slice portion. As previously described, slice controller 110 may modify the number or type of access devices 107, the RAT, the number of carriers, antenna configuration, location of the server and/or other parameters pertaining to the portion of the network slice, the number and/or type of connections (e.g., DC, etc.), the radio scheduler, and so forth, as described herein.

In block 625, the modification to the current provisioning of the portion of the network slice may be invoked or executed. For example, slice controller 110 may configure and/or cause a configuration change of the portion of the network slice based on the modified configuration calculated. Process 600 may return to block 610.

Although FIG. 6 illustrates an exemplary embodiment of a process of the SLA-based network slice control service, according to other exemplary scenarios, the SLA-based network slice control service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
receiving, by a network device, network slice configuration data that includes performance metrics and corresponding performance metric values to be satisfied by a network slice that is configurable for multiple tiers of service based on one or multiple first performance metric values that are distinct for each tier of the multiple tiers of service and one or multiple other first performance metric values that are the same across all of the multiple tiers of service;

calculating, by the network device based on the network slice configuration data, a first configuration for network resources of a network that will satisfy a first tier of the multiple tiers of service; and provisioning, by the network device based on the first configuration, the network slice.

2. The method of claim 1, wherein the network slice configuration data indicates a tier of a multi-tier application layer network that is to be satisfied by the network slice.

3. The method of claim 1, wherein the one of multiple first performance metric values relate to at least one of latency or reliability.

4. The method of claim 1, further comprising:
obtaining, by the network device, after the provisioning, state information pertaining to the network slice; and
determining, by the network device based on the state information, whether the network slice is to be re-provisioned.

5. The method of claim 1, wherein the performance metrics pertain to at least one of reliability, latency, or throughput.

6. The method of claim 1, wherein the network is a radio access network.

7. The method of claim 1, wherein the network slice is only a portion of an end-to-end network slice.

8. A network device comprising:
a processor configured to:
receive network slice configuration data that includes performance metrics and corresponding performance metric values to be satisfied by a network slice that is configurable for multiple tiers of service based on one or multiple first performance metric values that are distinct for each tier of the multiple tiers of service and one or multiple other first performance metric values that are the same across all of the multiple tiers of service;
calculate, based on the network slice configuration data, a first configuration for network resources of a network that will satisfy a first tier of the multiple tiers of service; and
provision, based on the first configuration, the network slice.

9. The network device of claim 8, wherein the network slice configuration data indicates a tier of a multi-tier application layer network that is to be satisfied by the network slice.

10. The network device of claim 8, wherein the one of multiple first performance metric values relate to at least one of latency or reliability.

11. The network device of claim 8, wherein the processor is further configured to:
obtain, after the provisionment, state information pertaining to the network slice; and
determine, based on the state information, whether the network slice is to be re-provisioned.

12. The network device of claim 8, wherein the performance metrics pertain to at least one of reliability, latency, or throughput.

13. The network device of claim 8, wherein the network is a radio access network.

14. The network device of claim 8, wherein the network slice is only a portion of an end-to-end network slice.

15. A non-transitory computer-readable storage medium storing instructions executable by a processor of a network device, which when executed cause the network device to:
receive network slice configuration data that includes performance metrics and corresponding performance metric values to be satisfied by a network slice that is configurable for multiple tiers of service based on one or multiple first performance metric values that are distinct for each tier of the multiple tiers of service and one or multiple other first performance metric values that are the same across all of the multiple tiers of service;
calculate, based on the network slice configuration data, a first configuration for network resources of a network that will satisfy a first tier of the multiple tiers of service; and
provision, based on the first configuration, the network slice.

16. The non-transitory computer-readable storage medium of claim 15, wherein the network slice configuration data indicates a tier of a multi-tier application layer network that is to be satisfied by the network slice.

17. The non-transitory computer-readable storage medium of claim 15, wherein the network is a radio access network.

18. The non-transitory computer-readable storage medium of claim 15, wherein the performance metrics pertain to at least one of reliability, latency, or throughput.

19. The non-transitory computer-readable storage medium of claim 15, wherein the network slice is only a portion of an end-to-end network slice.

20. The non-transitory computer-readable storage medium of claim 15, wherein the one of multiple first performance metric values relate to at least one of latency or reliability.

* * * * *